(12) United States Patent
Yoshida (10) Patent No.: US 9,484,704 B2
(45) Date of Patent: Nov. 1, 2016

(54) GAS CIRCULATION TYPE LASER OSCILLATOR

(71) Applicant: FANUC CORPORATION, Minamitsuru-gun, Yamanashi (JP)

(72) Inventor: Hiroyuki Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/712,348

(22) Filed: May 14, 2015

(65) Prior Publication Data

US 2015/0333469 A1 Nov. 19, 2015

(30) Foreign Application Priority Data

May 15, 2014 (JP) .................. 2014-101655

(51) Int. Cl.
| | |
|---|---|
| *H01S 3/034* | (2006.01) |
| *H01S 3/036* | (2006.01) |
| *H01S 3/07* | (2006.01) |
| *H01S 3/097* | (2006.01) |
| *H01S 3/104* | (2006.01) |
| *H01S 3/083* | (2006.01) |

(Continued)

(52) U.S. Cl.
CPC ............. *H01S 3/036* (2013.01); *H01S 3/0346* (2013.01); *H01S 3/073* (2013.01); *H01S 3/0835* (2013.01); *H01S 3/09705* (2013.01); *H01S 3/104* (2013.01); *H01S 3/223* (2013.01); *H01S 3/03* (2013.01); *H01S 3/0971* (2013.01); *H01S 3/2232* (2013.01)

(58) Field of Classification Search
CPC ....... H01S 3/034; H01S 3/0346; H01S 3/036

USPC .................................................... 372/58, 107
See application file for complete search history.

(56) References Cited

U.S. PATENT DOCUMENTS

| | | | | |
|---|---|---|---|---|
| 4,672,621 A | * | 6/1987 | Morita et al. ............. | 372/58 |
| 5,268,919 A | * | 12/1993 | Hongu et al. ............. | 372/61 |

(Continued)

FOREIGN PATENT DOCUMENTS

| | | |
|---|---|---|
| JP | 55053472 | 4/1980 |
| JP | 55121691 | 9/1980 |

(Continued)

OTHER PUBLICATIONS

Japanese Office Action mailed Aug. 4, 2015 for Japanese Application No. 2014-101655, including English translation.

(Continued)

*Primary Examiner* — Tod T Van Roy
(74) *Attorney, Agent, or Firm* — RatnerPrestia (57) ABSTRACT

A laser oscillator comprising an electric discharge excitation part having a discharge tube, and generates laser by excitation discharge of a laser gas flow through the inside of the discharge tube, an optical resonance part which has optical components attached to outsides of end walls of the discharge tube, and resonates laser generated in the discharge tube, and blower piping which connects an intake port and exhaust port of the discharge tube to form a circulation path of laser gas. The end walls of the discharge tube are provided with through holes which connect the inside of the discharge tube and the optical components, and blocking members are arranged in the through holes so as to block the flow of laser gas through the through holes toward the optical components.

7 Claims, 4 Drawing Sheets

(51) Int. Cl.
   *H01S 3/223*    (2006.01)
   *H01S 3/0971*   (2006.01)
   *H01S 3/03*     (2006.01)

(56) References Cited

U.S. PATENT DOCUMENTS

| | | | | |
|---|---|---|---|---|
| 5,450,435 | A | * | 9/1995 | Yamane et al. ............ 372/58 |
| 5,856,992 | A | * | 1/1999 | Karube et al. ............ 372/58 |
| 5,898,724 | A | * | 4/1999 | Takenaka et al. ........... 372/61 |
| 2003/0179798 | A1 | * | 9/2003 | Egawa et al. ............ 372/69 |

FOREIGN PATENT DOCUMENTS

| JP | 57184267 | 11/1982 |
|---|---|---|
| JP | 58187164 | 12/1983 |
| JP | 60022387 | 2/1985 |
| JP | 63009178 | 1/1988 |
| JP | 64037067 | 3/1989 |
| JP | 01096976 | 4/1989 |
| JP | 02308585 | 12/1990 |
| JP | H05-102575 A | 4/1993 |
| JP | H05-167131 A | 7/1993 |
| JP | 05251792 | 9/1993 |
| JP | 06090041 | 3/1994 |
| JP | 08505005 | 5/1996 |
| JP | 2000114623 | 4/2000 |
| JP | 2003-110171 A | 4/2003 |
| JP | 2003283009 | 10/2003 |
| JP | 2008004584 | 1/2008 |

OTHER PUBLICATIONS

Japanese Office Action mailed Oct. 27, 2015 for Japanese Application No. 2014-101655 including English Language Translation.

* cited by examiner

GAS CIRCULATION TYPE LASER OSCILLATOR

BACKGROUND OF THE INVENTION

1. Field of the Invention

The present invention relates to a gas circulation type laser oscillator which is mounted in a laser processing machine which is mainly used for cutting, welding, etc. of metal materials and plastic materials etc., and is configured to generate laser by excitation discharge of a laser gas flow through the inside of a discharge tube.

2. Description of the Related Art

Laser oscillators which generate laser by excitation discharge of a mixed gas circulating through a ring-shaped blower path are widely used. Such a laser oscillator is called a "gas circulation type laser oscillator". In a gas circulation type laser oscillator, dust or particulate matter which enters the blower path during assembly, and a foreign substance such as quartz powder which is produced during excitation discharge due to abrasion of the inner wall of a discharge tube made from quarts may also circulate inside the blower path together with the mixed gas. Furthermore, an oxidation reaction of ozone which is produced during excitation discharge of the mixed gas may also cause formation of various oxides. If these foreign matters adhere to a partial reflector or total reflector or other optical components, the output power of the laser will reduce, and it may create a need to clean or replace the optical components. In relation to this, JPH05-167131A proposes a gas laser oscillator in which a protective cover which doubly serves as a blower guide of the laser gas is arranged near a support rod which connects an output side resonator and a rear side resonator so as to minimize the thermal impact on the support rod due to high temperature laser gas.

Further, JP2003-110171A proposes a laser oscillator which employs a plurality of slit-shaped laser gas introduction ports which are arranged on the same circumference so as to prevent turbulence which can occur near the laser gas introduction ports, and entrainment of electrode powder and other foreign matter due to the turbulence. Furthermore, the laser oscillator of JP2003-110171A is structured so that the laser gas introduction ports are arranged near the reflection mirrors, and raises the gas pressure of the laser gas which is supplied from the laser gas introduction ports to the reflection mirrors so as to prevent impurities produced in a laser resonating cavity from scattering to the reflection mirrors. However, according to the structure of the laser oscillator of JP2003-110171A, foreign matter which had adhered to the inside wall of the feed piping of the laser gas may be discharged near the reflection mirrors, and therefore the reflection mirrors may be contaminated further due to that foreign matter. Further, JPH05-102575A proposes a laser oscillator which employs a plate type heat exchanger which is expected to facilitate the removal of dust produced during the manufacturing process. However, the laser oscillator of JPH05-102575A can only prevent mixing of the foreign matter in the heat exchanger into the blower path during the time of assembly, and cannot prevent contamination of the optical components due to foreign matter which is produced due to excitation discharge of the laser gas.

A gas circulation type laser oscillator which can prevent dust mixed in the laser gas from adhering to the optical components is being sought.

SUMMARY OF INVENTION

According to a first aspect of the present invention, there is provided a laser oscillator comprising an electric discharge excitation part which has a discharge tube extending in one direction, and generates laser by discharge excitation of a laser gas flow through the inside of the discharge tube, an optical resonance part which has optical components attached to outsides of end walls in the extension direction of the discharge tube, and resonates laser which is generated in the discharge tube, and blower piping which connects an intake port and exhaust port of the discharge tube to form a circulation path of laser gas, wherein the end walls of the discharge tube are provided with through holes which connect the inside of the discharge tube and the optical components, and blocking members are arranged in the through holes so as to block the laser gas flow through the through holes toward the optical components arranged at them.

According to a second aspect of the present invention, there is provided a laser oscillator in the first aspect, wherein the blocking members have hollow tubular forms, and gaps are provided between the outer circumferential surfaces of the blocking members and inner circumferential surfaces of the through holes.

According to a third aspect of the present invention, there is provided a laser oscillator in the first or second aspect, wherein the through holes have columnar forms and the blocking members have cylindrical forms, and inside diameters of the blocking members are within ranges of 65% to 80% of the diameters of the through holes.

According to a fourth aspect of the present invention, there is provided a laser oscillator in the third aspect, wherein inside diameters of the blocking members are smaller than an inside diameter of the blower piping.

According to a fifth aspect of the present invention, there is provided a laser oscillator in the fourth aspect, wherein both of a feed source which feeds laser gas to the circulation path and an exhaust pump which exhausts laser gas from the circulation path are connected to the middle of the blower piping, and neither the feed source nor the exhaust pump is connected to a space which is located in front of the optical components.

According to a sixth aspect of the present invention, there is provided a laser oscillator in any one of the first to fifth aspects, wherein the blocking members are formed from a heat conducting material.

According to a seventh aspect of the present invention, there is provided a laser oscillator in any one of the first to sixth aspects, wherein the through holes, the optical components, and the blocking members are provided on both sides in the extension direction of the discharge tube.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
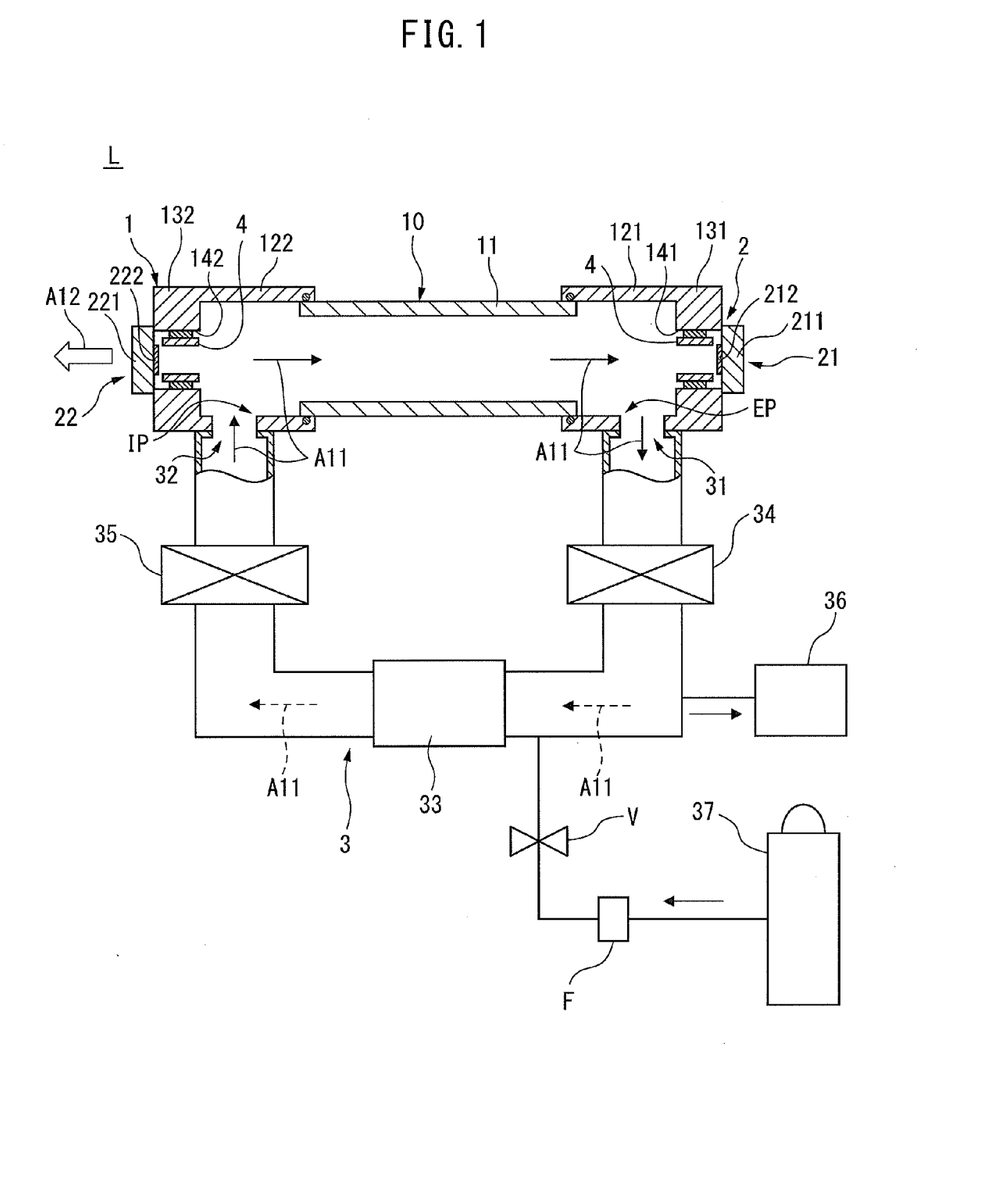
FIG. 1 is a longitudinal cross-sectional view of one embodiment of the present invention.

Referring to FIG. 1 to FIG. 6, a laser oscillator of one embodiment of the present invention will be explained. The laser oscillator of the present embodiment is a gas circulation type laser oscillator which is configured to generate laser by circulating laser gas mainly comprised of carbon dioxide gas, nitrogen gas, and helium gas at a high speed, and causing high frequency electric discharge in the laser gas to excite the carbon dioxide gas. The laser oscillator of the present embodiment can be mounted in a laser processing machine which is mainly used for cutting, welding, etc. of metal materials and plastic materials etc. FIG. 1 is a longitudinal cross-sectional view of an illustrative laser oscillator L of the present embodiment. In FIG. 1, only the later explained discharge tube and its vicinity are shown by cross-section.

As shown in FIG. 1, the laser oscillator L of the present example is provided with an electric discharge excitation part 1 which generates laser by excitation discharge of a laser gas flow through the inside of a discharge tube 10, an optical resonance part 2 which resonates laser which is generated in the discharge tube 10, and blower piping 3 which connects an intake port IP and exhaust port EP of the discharge tube 10 to form a circulation path of the laser gas. As shown in FIG. 1, the discharge tube 10 and blower piping 3 of the present example form a ring-shaped sealed container which has a continuous inside space. This sealed container is connected to the outside by only an exhaust valve (not shown) of a later explained exhaust pump 36 and a feed valve V of a laser gas feed source 37. The laser gas in this sealed container is circulated at a high speed by a later explained blower 33 in a direction of an arrow mark A11 in FIG. 1. Details of the electric discharge excitation part 1, optical resonance part 2, and blower piping 3 of the present example will be explained below.

First, the electric discharge excitation part 1 of the present example will be explained. As shown in FIG. 1, the electric discharge excitation part 1 of the present example is provided with a hollow discharge tube 10 which extends in one direction, and a pair of electrodes (not shown) which are arranged in the discharge tube 10. By applying high frequency voltage across these electrodes, the laser gas in the discharge tube 10 is excited by electric discharge. Stimulated emission of laser is thus caused inside the discharge tube 10. As shown in FIG. 1, the discharge tube 10 of the present example has a cylindrical electric discharge part 11 which has an inside space in which laser gas is excited by electric discharge, a cylindrical first support part 121 which extends outward from one end part of the electric discharge part 11, and a cylindrical second support part 122 which extends outward from the other end part of the electric discharge part 11. As shown in FIG. 1, a first support part 121 and a second support part 122 of the present example support the electric discharge part 11 with respect to the blower piping 3.

As shown in FIG. 1, the inside spaces of the first support part 121 and the second support part 122 are connected to the inside space of the electric discharge part 11. Further, at the locations of contact of the first support part 121 and the second support part 122 with the electric discharge part 11, O-rings are attached for sealing in the laser gas inside the discharge tube 10. Further, a front end of the first support part 121 in the extension direction is closed by a first end wall 131, while the first end wall 131 is provided with a columnar through hole 141 which extends in parallel with the first support part 121. Similarly, a front end of the second support part 122 in the extension direction is closed by a second end wall 132, while the second end wall 132 is provided with a columnar through hole 142 which extends in parallel with the second support part 122. Furthermore, the peripheral wall of the cylindrical first support part 121 is provided with an exhaust port EP for exhausting laser gas which has passed through the electric discharge part 11, while the peripheral wall of the cylindrical second support part 122 is provided with an intake port IP for sucking in laser gas which has passed through the blower piping 3.

Next, the optical resonance part 2 of the present example will be explained. As shown in FIG. 1, the optical resonance part 2 of the present example is comprised of a first optical component 21 and a second optical component 22 which are arranged to interpose the discharge tube 10 therebetween. The first optical component 21 of the present example is a total reflector which reflects substantially the entire laser which is generated in the discharge tube 10. More specifically, the first optical component 21 of the present example has a disk-shaped main body 211 which is mounted to an outside surface of the first end wall 131 of the discharge tube 10, and a circular mirror surface part 212 which is provided on a flat surface of the main body 211 which faces the discharge tube 10. The mirror surface part 212 of the first optical component 21 can be formed by vacuum deposition of a multilayer of gold, aluminum, a fluorine compound, etc., on a main body 211 which is made of copper, germanium crystal, or silicon crystal, for example. The mirror surface part 212 of the first optical component 21 has a 99.5% or more reflectance.

Further, the second optical component 22 of the present example is a partial reflector which reflects only part of the laser which is generated in the discharge tube 10. More specifically, the second optical component 22 of the present example has a disk-shaped main body 221 which is mounted to an outside surface of the second end wall 132 of the discharge tube 10, and a circular mirror surface part 222 which is provided on the flat surface of the main body 221 which faces the discharge tube 10. The mirror surface part 222 of the second optical component 22 can be formed by vacuum deposition of a multilayer of aluminum, a fluorine compound, etc., on a main body 221 which is made of zinc selenide (ZnSe), for example. The mirror surface part 222 of the second optical component 22 has a 10% to 80% or so reflectance. The above structured optical resonance part 2 resonates the laser which was generated inside the discharge tube 10 to produce a laser beam of a predetermined output. More specifically, the optical resonance part 2 of the present example repeatedly reflects and amplifies the laser which was generated due to the stimulated emission by the pair of mirror surface parts 212, 222 and outputs part of the laser as a laser beam from the partial reflective mirror (that is, second optical component 22). The optical axis of this thus output laser beam is shown by the arrow mark A12 in FIG. 1.

Continuing, if referring to FIG. 1, the through hole 141 which is formed in the first end wall 131 of the discharge tube 10 connects the inside space of the discharge tube 10 and the mirror surface part 212 of the first optical component 21. That is, the mirror surface part 212 of the first optical component 21 is exposed through the through hole 141 to the inside space of the discharge tube 10. Similarly, the through hole 142 which is formed in the second end wall 132 of the discharge tube 10 connects the inside space of the discharge tube 10 and the mirror surface part 222 of the second optical component 22. That is, the mirror surface part 222 of the second optical component 22 is exposed through the through hole 142 to the inside space of the discharge tube 10. Further, blocking members 4 are arranged in the through holes 141, 142 of the discharge tube 10 so as to block the laser gas flow which would pass through the through holes 141, 142 toward the mirror surface parts 212, 222. More specifically, a blocking member 4 is arranged in the through hole 141 of the first end wall 131 so as to block the laser gas which has passed through the electric discharge part 11 from flowing along the mirror surface part 212 of the first optical component 21. Similarly, another blocking member 4 is arranged in the through hole 142 of the second end wall 132 so as to block the laser gas which has passed through the blower piping 3 from flowing toward the mirror surface part 222 of the second optical component 21. The detailed structure of these blocking members 4, 4 will be explained later.

Next, the blower piping 3 of the present example will be explained. As shown in FIG. 1, the blower piping 3 of the present example has a first connection port 31 which is connected to the exhaust port EP of the discharge tube 10, and a second connection port 32 which is connected to the intake port IP of the discharge tube 10. That is, the blower piping 3 of the present example forms a circulation path for delivering laser gas which has passed through the electric discharge part 11 of the discharge tube 10 to be exhausted from the exhaust port EP up to the intake port IP. As shown in FIG. 1, a blower 33 is set generally at the midpoint of the blower piping 3 of the present example so as to circulate the laser gas along the circulation path which is expressed by the arrow mark A11 in the figure. Further, the laser gas excited by electric discharge inside the discharge tube 10 is high in temperature, and therefore heat exchangers 34, 35 are set at a predetermined point in the blower piping 3 which is located upstream of the blower 33 and a predetermined point in the flow piping 3 which is located downstream of the blower 33, respectively. The heat exchangers 34, 35 are configured to cool the laser gas which has passed through the discharge tube 10. Furthermore, an exhaust pump 36 is connected between the upstream side heat exchanger 34 in the blower piping 3 and the blower 33 so as to exhaust from the circulation path part of the laser gas which has passed through the discharge tube 10. A laser gas feed source 37 such as a gas canister is connected between the exhaust pump 36 and blower 33 by the intermediary of a filter F and a valve V, and the laser gas source 37 is configured to feed clean laser gas to the circulation path.

Figure 2:
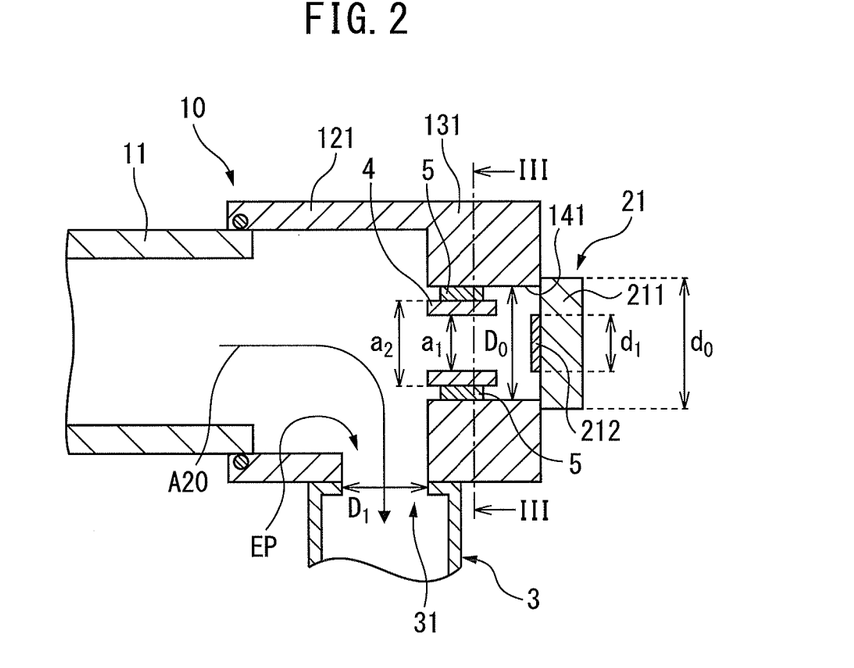
FIG. 2 is a partial enlarged view which shows a first support part and its vicinity of a discharge tube in FIG. 1.

Next, the detailed structure of the above-mention pair of blocking members 4, 4 will be explained. Note that, the pair of blocking members 4, 4 according to the present example have identical structures. Below, only the blocking member 4 which is arranged in the through hole 141 of the first end wall 131 of the discharge tube 10 will be explained. FIG. 2 is a partial enlarged view which shows the first end wall 131 and its vicinity of the discharge tube 10 in FIG. 1. The arrow mark A20 in FIG. 2 shows part of the circulation path of the laser gas. As shown in FIG. 2, by arranging the blocking member 4 of the present example in the through hole 141 of the first end wall 131, it is possible to reduce the cross-sectional area of the through hole 141 in a direction vertical to the extension direction, and thus block part of the flow of the laser gas which passes through the through hole 141 toward the mirror surface part 212. As a result, it is possible to reduce the flow rate of the laser gas which passes through the through hole 141 to reach the mirror surface part 212, and thus prevent the dust which enters the laser gas from adhering to the mirror surface part 212 and damaging the mirror surface part 212.

Figure 3:
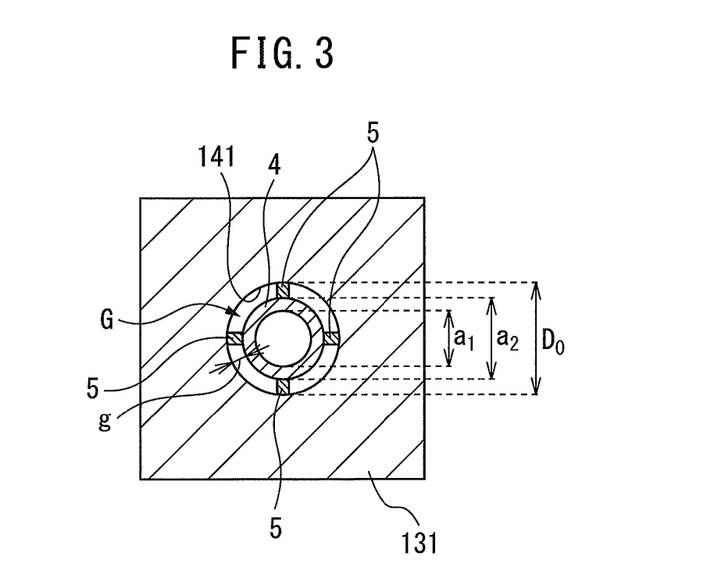
FIG. 3 is a cross-sectional view along the line III-III in FIG. 2.

FIG. 3 is a cross-sectional view along of FIG. 2. As shown in FIG. 2 and FIG. 3, the blocking member 4 of the present example has a cylindrical shape which is arranged in parallel with the cylindrical discharge tube 10. The outer circumferential surface is provided with a plurality of rib members 5 which stick out outward in the radial direction. As shown in FIG. 3, the outer circumferential surface of the blocking member 4 of the present example is provided with four rib members 5 which are arranged at equal intervals in the peripheral direction. These rib members 5 may be bonded or welded to the outer circumferential surface of the blocking member 4 or may be formed integrally with the blocking member 4. Further, the front end faces of these rib members 5 are placed in contact with the inner circumferential surface of the through hole 141 so that the blocking member 4 is attached to the through hole 141.

As shown in FIG. 2 and FIG. 3, the four rib members 5 of the present example have the same dimensions and shapes, and therefore the cylindrical blocking member 4 is arranged concentrically with the columnar through hole 141. Further, the blocking member 4 of the present example is exposed to the inside space of the discharge tube 10 (see FIG. 2). In this inside space, high power laser is generated by the stimulated emission, and therefore the blocking member 4 of the present example is preferably formed from a material which is excellent in heat conductivity. The blocking member 4 of the present example may be formed from metal material such as copper, brass, and aluminum, or a ceramic material that has excellent heat conductivity such as alumina. Note that, the above-mentioned mounting structure of the blocking member 4 is just one example. The laser oscillator L of the present embodiment can employ various mounting structures different from the present example. Modifications of the mounting structure of the blocking member 4 will be explained later.

Figure 4:
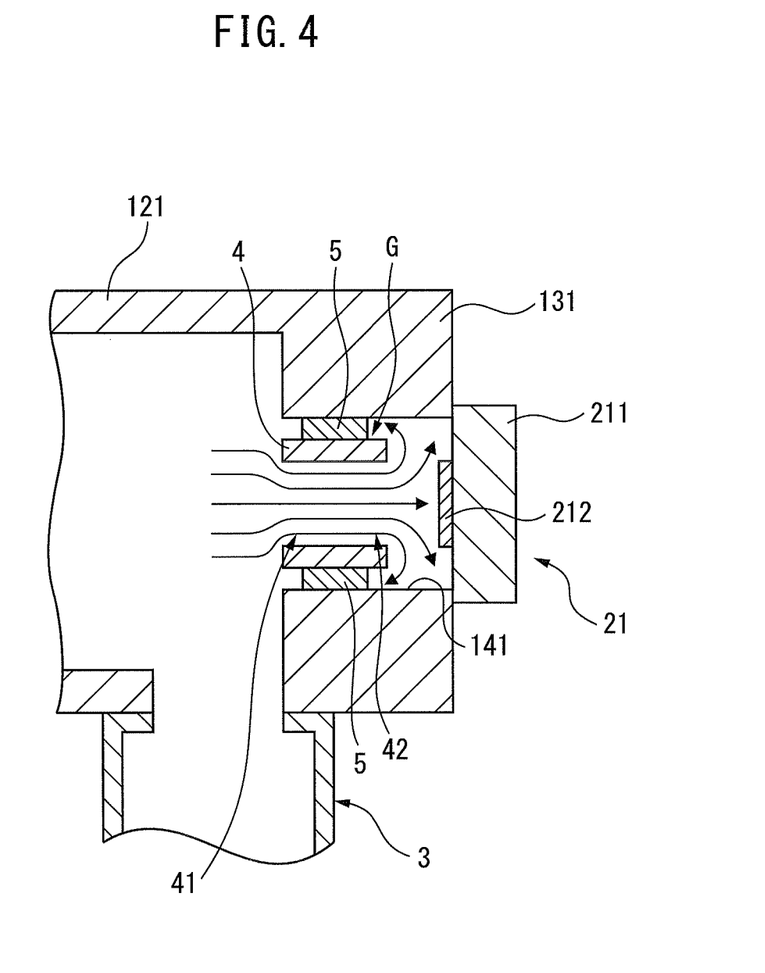
FIG. 4 is a diagram for explaining the laser gas flow which passes through the inside of a cylindrical blocking member in FIG. 2.

As shown in FIG. 3, between the outer circumferential surface of the cylindrical blocking member 4 and the inner circumferential surface of the columnar through hole 141, there is a gap G with dimensions corresponding to the rib members 5. This gap G can exhibit the effect of reducing the possibility that the dust mixed in the laser gas adheres to the mirror surface part 212. This effect will be explained below in detail. FIG. 4 is a partial enlarged view which shows the blocking member 4 and its vicinity in FIG. 2. The arrow marks in FIG. 4 express the laser gas flow which passes through the inside of the cylindrical blocking member 4. As shown in FIG. 4, when the laser gas from one opening part 41 of the blocking member 4 is pressurized in the inside of the blocking member 4, the jet stream which is generated at the opposite opening 42 causes the laser gas flow in the inside of the blocking member 4 to decelerate and part of the flow to enter into the gap G. It is therefore possible to decrease the flow rate of the laser gas which reaches the mirror surface part 212, and thus reduce the possibility that the dust mixed in the laser gas adheres to the mirror surface part 212. As a result, it is possible to lengthen the lifetime of the first optical component 21.

Referring again to FIG. 2 and FIG. 3, specific dimensions of the blocking member 4 of the present example will be explained. First, in order to prevent the blocking member 4 from interrupting the optical axis of the laser which runs back and forth between the mirror surface parts 212, 222 of the optical resonance part 2, the inside diameter $a_1$ of the cylindrical blocking member 4 is substantially equal to the diameter $d_1$ of the circular mirror surface part 212. Alternatively, the inside diameter $a_1$ of the blocking member 4 may be larger than the diameter $d_1$ of the mirror surface part 212 by about 5% (in this case, $a_1=1.05 \times d_1$) in consideration of dimensional tolerances of the blocking member 4 and mirror surface part 212 etc. Furthermore, in order to ensure that the laser gas which passes through the electric discharge part 11 flows in the blower piping 3 rather than the through hole 141, the inside diameter $a_1$ of the cylindrical blocking member 4 is sufficiently smaller than the inside diameter $D_1$ of the first connection 31 of the blower piping 3. More specifically, the inside diameter $a_1$ of the blocking member 4 of the present example is 25% of the inside diameter $D_1$ of the blower piping 3 (That is, $a_1=0.25 \times D_1$). Note that, the diameter $d_1$ of the circular mirror surface part 212 is equal to or smaller than 0.9 time the diameter $d_0$ of the disk-shaped main body 211 (That is, $d_1 \leq 0.9 \times d_0$).

Further, measurement result of the flow rate of the laser gas which reaches the mirror surface part passes through the through hole 141 for a plurality of blocking members 4 with different inside diameters indicates that the flow rate is greatly decreased when the inside diameter $a_1$ of the blocking member 4 is 65% to 80% or so of the diameter $D_0$ of the through hole 141. That is, preferably the following equation (1) is satisfied with regard to the inside diameter $a_1$ of the blocking member 4. Furthermore, in the case where the diameter $D_0$ of the through hole 141 is 40 mm, the above flow rate is particularly reduced when the inside diameter $a_1$ of the blocking member 4 is 68% to 78% of the diameter $D_0$ of the through hole. That is, in the case where the diameter $D_0$ of the through hole 141 is 40 mm, it is particularly preferable that the inside diameter $a_1$ of the blocking member 4 range between 27 mm to 31 mm in range.

Equation 1

$$0.65 \times D_0 \leq a_1 \leq 8 \times D_0 \quad (1)$$

Further, in order to decrease the flow rate of laser gas which reaches the mirror surface part 212, the dimension "g" of the above gap G in the radial direction is preferably 4 mm or less. The dimension "g" of the gap G in the radial direction is expressed by the following equation (2), and therefore the following equation (3) is preferably satisfied with regard to the outside diameter $a_2$ of the cylindrical blocking members 4. Furthermore, the dimension of the cylindrical blocking member 4 in the extension direction (that is, the dimension in the left-right direction of FIG. 2) is preferably 20 mm or more. Note that, the blocking member 4 as a whole may be arranged in the through hole 141 as shown in FIG. 2. However, part of the blocking member 4 in the extension direction may also stick out from the through hole 141 to the electric discharge part 11 side.

Equation 2

$$g=(D_0-a_z)/2 \quad (2)$$

Equation 3

$$(D_s-a_z)/2 \leq 4 \text{ mm} \quad (3)$$

Figure 5:
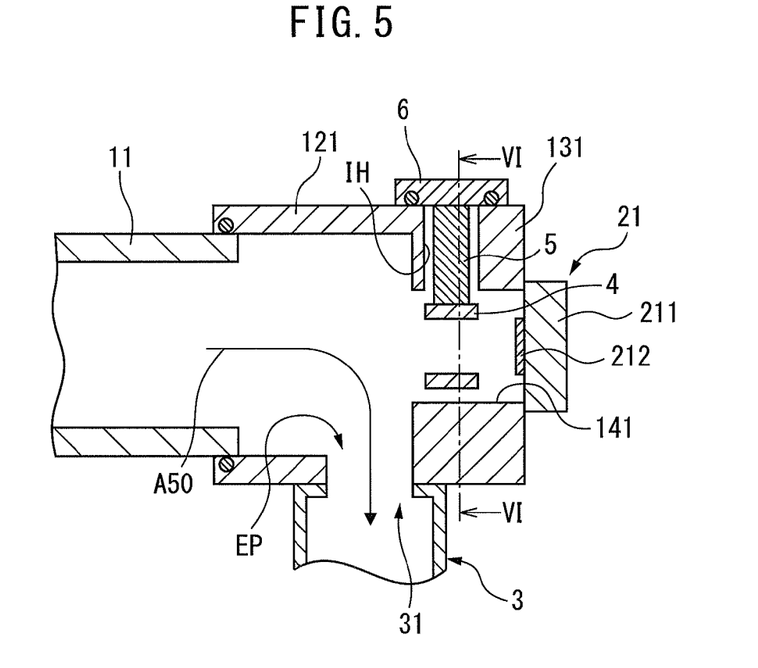
FIG. 5 is a partial enlarged view, similar to FIG. 2, which shows a modification of a mounting structure of a blocking member in a laser oscillator of the present embodiment.
Figure 6:
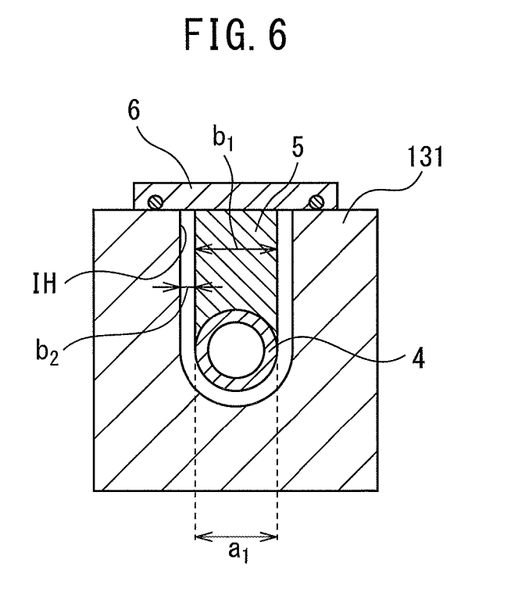
FIG. 6 is a cross-sectional view along the line VI-VI in FIG. 5.

Next, referring to FIG. 5 and FIG. 6, a modification of the mounting structure of the blocking member 4 will be explained. FIG. 5 is a partial enlarged view, similar to FIG. 2, which shows a modification of the mounting structure of the blocking member 4 in the laser oscillator L of the present embodiment. The arrow mark A50 in FIG. 5 shows part of the circulation path of the laser gas. Further, FIG. 6 is a cross-sectional view along the line VI-VI in FIG. 5. As shown in FIG. 5 and FIG. 6, in the mounting structure of the present example, the outer circumferential surface of the cylindrical blocking member 4 is provided with a single rib member 5 which projects outward in the radial direction. The front end of the rib member 5 in the projecting direction is provided with a flange member 6 which extends vertical to the projecting direction of the rib member 5. Further, a first end wall 131 of the discharge tube 10 according to the present example is further provided with an insertion hole IH which enables the blocking member 4 to be inserted into the through hole 141. This insertion hole IH extends inward in the radial direction from the outer circumferential surface of the first end wall 131 to reach the through hole 141. As shown in FIG. 5 and FIG. 6, the opening part of the insertion hole IH at the outer circumferential surface of the first end wall 131 is closed by the flange member 6. Further, the contact part of the flange member 6 with the outer circumferential surface of the first end wall 131 is fitted with an O-ring for sealing in the laser gas in the discharge tube 10.

In this way, in the mounting structure of the present example, the flange member 6 abuts against the outer circumferential surface of the first end wall 131 so that the blocking member 4 is attached in the through hole 141. Here, in order to reduce the flow rate of laser gas which reaches the mirror surface part 212 through the outside of the cylindrical blocking member 4, it is preferable that the dimension $b_1$ of the rib member 5 in the width direction which is vertical to both the projecting direction of the rib member 5 (that is, up-down direction of FIG. 5) and the extension direction of the blocking member 4 (that is, left-right direction of FIG. 5) is substantially equal to the outside diameter $a_1$ of the blocking member 4, and the distance $b_2$ between the end face of the rib member 5 in the width direction and the inner wall of the insertion hole IH facing the end face of the rib member 5 is 0.5 mm or so (see FIG. 6). In the mounting structure of the present example, the blocking members 4 which are arranged in the through holes 141 can be easily changed in accordance with the dimensions and shape etc. of the mirror surface part 212. Note that, the position of the insertion hole IH in the outer circumferential surface of the first end wall 131 is not limited to only the example which is shown in FIG. 5 and FIG. 6.

In this way, according to the laser oscillator L of the present embodiment, the laser gas flow through the through holes 141, 142 of the discharge tube 10 toward the mirror surface parts 212, 222 of the optical resonance part 2 is blocked by the blocking members 4, 4, and therefore it is possible to prevent dust mixed in the laser gas from adhering to the mirror surface parts 212, 222 and damaging the mirror surface parts 212, 222. Therefore, according to the laser oscillator L of the present embodiment, it is possible to suppress reduction in laser output due to contamination of the mirror surface parts 212, 222, and thus lengthen the lifetimes of the first optical component 21 and the second optical component 22. Further, in the laser oscillator L of the present embodiment, the laser gas feed source which feeds laser gas to the circulation path is connected to the middle of the blower piping which connects the intake port IP and exhaust port EP of the discharge tube 10. Therefore, in the laser oscillator L of the present embodiment, the laser gas supplied from the laser gas feed source 37 will never be directly blown on the mirror surface parts 212, 222, and therefore it is possible to prevent contaminants which may be present in the feed piping of the laser gas from adhering to the mirror surface parts 212, 222. Furthermore, in the laser oscillator L of the present embodiment, the exhaust pump 36 which exhausts the laser gas from the circulation path is also connected to the middle of the blower piping 3 in the same way as the laser gas feed source 37. Therefore, in the laser oscillator L of the present embodiment, the mirror surface parts 212, 222 are never exposed to the local flow accompanying exhaust of laser gas, and therefore it is possible to reduce the possibility that the dust mixed in the laser gas adheres to the mirror surface parts 212, 222.

EFFECT OF INVENTION

According to the first aspect of the present invention, the laser gas flow toward the optical components through the through holes on the end walls of the discharge tube is blocked by the blocking members, and therefore it is possible to prevent the dust mixed in the laser gas from adhering to the optical components and damaging the optical components. Therefore, according to the first aspect, it is possible to suppress the reduction in the laser output due to contamination of the optical components, and thus lengthen the lifetime of the optical components.

According to the second aspect of the present invention, part of the laser gas which passes through the insides of the cylindrical blocking members may flow into the gaps between the outer circumferential surfaces of the blocking members and the inner circumferential surfaces of the through holes, and therefore it is possible to reduce the flow rate of the laser gas which strikes the optical components. Therefore, according to the second aspect, it is possible to reduce the possibility that dust mixed in the laser gas adheres to the optical components.

According to the third aspect of the present invention, it is possible to decrease the flow rate of the laser gas which passes through the insides of the cylindrical blocking members toward the optical components, and thus reduce the possibility that dust mixed in the laser gas adheres to the optical components.

According to the fourth aspect of the present invention, it is possible to ensure that the laser gas which passes through the discharge tube flows into the blower piping rather than through the through holes of the end walls, and thus reduce the flow rate of laser gas which reaches the optical components through the through holes. Therefore, according to the fourth aspect, it is possible to reduce the possibility that dust mixed in the laser gas adheres to the optical components.

According to the fifth aspect of the present invention, laser gas which is fed from the outside is not directly blown to the optical components, and therefore it is possible to prevent contaminants which may be present in the feed piping of the laser gas from adhering to the optical components. Furthermore, according to the fifth aspect, the optical components are never exposed to any local flow accompanying exhaust of laser gas, and therefore it is possible to reduce the possibility that dust mixed in the laser gas adheres to the optical components.

According to the sixth aspect of the present invention, the blocking members have high heat conductivity, and therefore it is possible to prevent the blocking members from being overheated by the high power laser which is generated in the discharge tube.

According to the seventh aspect of the present invention, a blocking member for blocking the laser gas flow is provided on both sides in the extension direction of the discharge tube, and therefore it is possible to prevent dust mixed in the laser gas from adhering to the pair of optical components and damaging the pair of optical components.

The present invention is not limited to the above-mentioned embodiments and can be modified in various ways within the scope described in the claims. Therefore, the dimensions, shapes, materials, etc. of the parts of the laser oscillator L which are described in the above embodiments are only examples. Various dimensions, shapes, materials, etc. can be employed for achieving the effects of the present invention. For example, the blocking members 4 of the laser oscillator L of the present invention do not necessarily have to have the above-mentioned cylindrical forms, and can have any forms which do not interfere with the laser which is repeatedly reflected at the optical resonance part 2.

The invention claimed is:

1. A laser oscillator comprising:
    an electric discharge excitation part which has a discharge tube extending in one direction, and generates laser by excitation discharge of a laser gas flow through the inside of said discharge tube,
    an optical resonance part which has optical components attached to outsides of end walls in the extension direction of said discharge tube, and resonates laser which is generated in said discharge tube, and
    blower piping which connects an intake port and exhaust port of said discharge tube to form a circulation path of laser gas, wherein
    said end walls of said discharge tube are provided with through holes which connect the inside of said discharge tube and said optical components, and
    blocking members are arranged in said through holes and provided for reducing the cross-sectional areas of the through holes, so as to block the laser gas flow through said through holes toward said optical components, and
    an inner diameter of each blocking member is equal to or larger than a diameter of a reflective area of resonator mirrors which are attached to the optical components, and
    at least one blocking member is mounted to the laser oscillator by a single rib that is positioned through a hole disposed in the end wall.

2. The laser oscillator according to claim 1, wherein said blocking members have hollow tubular forms, and gaps are provided between the outer circumferential surfaces of said blocking members and inner circumferential surfaces of said through holes, and said blocking members are provided for reducing the cross-sectional area of the through holes.

3. The laser oscillator according to claim 1, wherein said through holes have columnar forms and said blocking members have cylindrical forms, and inside diameters of said blocking members are within ranges of 65% to 80% of the diameters of said through holes.

4. The laser oscillator according to claim 3, wherein inside diameters of said blocking members are smaller than an inside diameter of said blower piping.

5. The laser oscillator according to claim 4, wherein both of a feed source which feeds laser gas to said circulation path and an exhaust pump which exhausts laser gas from said circulation path are connected to the middle of said blower piping, and neither said feed source nor said exhaust pump is connected to a space which is located in front of said optical components.

6. The laser oscillator according to claim 1, wherein said blocking members are formed from a heat conducting material.

7. The laser oscillator according to claim 1, wherein said through holes, said optical components, and said blocking members are provided on both sides in the extension direction of said discharge tube.

* * * * *